United States Patent
Noguchi et al.

(10) Patent No.: US 8,781,274 B2
(45) Date of Patent: Jul. 15, 2014

(54) OPTICAL AMPLIFIER AND RESONATOR

(71) Applicants: Yoshikiyo Noguchi, Chiba (JP); Michihiro Nakai, Chiba (JP)

(72) Inventors: Yoshikiyo Noguchi, Chiba (JP); Michihiro Nakai, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/937,629

(22) Filed: Jul. 9, 2013

(65) Prior Publication Data
US 2013/0301987 A1 Nov. 14, 2013

Related U.S. Application Data

(62) Division of application No. 12/693,821, filed on Jan. 26, 2010, now Pat. No. 8,509,580.

(30) Foreign Application Priority Data

Jan. 27, 2009 (JP) ................. 2009-015766

(51) Int. Cl.
G02B 6/32 (2006.01)
G02B 6/00 (2006.01)
H01S 3/30 (2006.01)

(52) U.S. Cl.
USPC ................. 385/34; 385/33; 385/37; 385/122; 372/6

(58) Field of Classification Search
None
See application file for complete search history.

(56) References Cited

U.S. PATENT DOCUMENTS

| 5,473,713 | A | 12/1995 | Ronarc'H et al. |
| 5,530,709 | A | 6/1996 | Waarts et al. |
| 6,970,624 | B2 | 11/2005 | DiGiovanni et al. |
| 7,286,574 | B2 * | 10/2007 | Brasseur et al. .................. 372/4 |
| 7,844,146 | B2 | 11/2010 | Nicholson et al. |

(Continued)

FOREIGN PATENT DOCUMENTS

| JP | 2001-274490 A | 10/2001 |
| JP | 2002-261361 A | 9/2002 |
| JP | 2004-079876 A | 3/2004 |
| JP | 2007-123477 A | 5/2007 |

OTHER PUBLICATIONS

Fermann, M.E. et al., "Frequency doubling of Er-doped multi-mode fiber compressor-amplifiers", CLEO '98, pp. 189-190.

(Continued)

Primary Examiner — Michelle R Connelly
(74) Attorney, Agent, or Firm — Westerman, Hattori, Daniels & Adrian, LLP

(57) ABSTRACT

An optical amplifier includes: a first optical fiber, through which seed light and excitation light propagate; an optical coupler that inputs the excitation light into the first optical fiber; a first lens to which the seed light and the excitation light output from the first optical fiber are input and which increases diameters of the seed light and the excitation light; a glass rod doped with rare earth elements to be excited by the excitation light, to which the seed light and the excitation light output from the first lens are input and which amplifies and outputs the seed light as output light; a second lens to which at least the output light output from the glass rod is input and which decreases a diameter of the output light; and a second optical fiber to which the output light output from the second lens is input.

12 Claims, 5 Drawing Sheets

(56) References Cited

U.S. PATENT DOCUMENTS

| | | | |
|---|---|---|---|
| 7,957,619 B2 * | 6/2011 | Nicholson et al. | 385/122 |
| 8,229,260 B2 * | 7/2012 | Frith | 385/43 |
| 2005/0265653 A1 | 12/2005 | Cai et al. | |
| 2008/0180787 A1 * | 7/2008 | DiGiovanni et al. | 359/334 |
| 2009/0116809 A1 * | 5/2009 | Dianov et al. | 385/142 |
| 2012/0269211 A1 | 10/2012 | Fermann et al. | |

OTHER PUBLICATIONS

Fermann, M.E., "Single-mode excitation of multimode fibers with ultrashort pulses", Optics Letters, vol. 23, No. 1, Jan. 1, 1998.

* cited by examiner

OPTICAL AMPLIFIER AND RESONATOR

CROSS-REFERENCE TO RELATED APPLICATIONS

This is a divisional application of U.S. patent application Ser. No. 12/693,821, filed on Jan. 26, 2010, which claims the benefit of priority from the prior Japanese Patent Application No. 2009-015766, filed on Jan. 27, 2009, the entire contents of which are incorporated herein by references.

BACKGROUND OF THE INVENTION

The invention relates to an optical amplifier and a resonator.

In a field of a fiber laser device and an optical fiber communication, an optical fiber amplifier is used to increase an intensity of light in some cases. In such an optical fiber amplifier, an amplifying optical fiber doped with rare earth elements is extended or an intensity of at least one of seed light and excitation light input to the amplifying optical fiber is increased, in order to increase an intensity of output light output from the amplifier.

However, when the amplifying optical fiber is extended or the intensity of at least one of the seed light and the excitation light input to the amplifying optical fiber is increased, there may be a nonlinear optical effect such as stimulated Raman scattering and four-wave mixing in the amplifying optical fiber. In order to suppress the stimulated Raman scattering, the four-wave mixing, and the like, the amplifying optical fiber may be shortened and a concentration of the doped rare earth elements may be increased. However, when the concentration of the rare earth elements is increased, a concentration quenching occurs in which an excited lifetime of the rare earth elements is shortened so as to lower an amplification efficiency.

Therefore, in an optical amplifier described in Patent Document 1 listed below, a filter function element, which increases a transmission loss of light generated by the optical amplifier due to the nonlinear optical effect, is provided in the middle of an amplifying optical fiber so as to suppress an effect of the stimulated Raman scattering and the like.

Patent Document 1: Japanese Patent Application Laid-Open No. 2007-123477

SUMMARY OF THE INVENTION

However, in the optical amplifier described in Patent Document 1 listed above, there may be a case where the stimulated Raman scattering, the four-wave mixing, or the like occurs before light passes through the filter function element so as to lower an optical amplification efficiency before the light passes through the filter function element and a case where the stimulated Raman scattering, the four-wave mixing, or the like occurs after the light passes through the filter function element so as to lower an optical amplification efficiency after the light passes through the filter function element, and thus it may not be possible to output light having a sufficiently high intensity.

Therefore, an object of the invention is to provide an optical amplifier and a resonator capable of outputting output light having a high intensity.

An optical amplifier according to the invention includes: a first optical fiber through which seed light and excitation light propagate; a first lens to which the seed light and the excitation light output from the first optical fiber are input and which increases diameters of the seed light and the excitation light; a glass rod which is doped with rare earth elements to be excited by the excitation light, to which the seed light and the excitation light output from the first lens are input, and which amplifies and outputs the seed light as output light; a second lens to which at least the output light output from the glass rod is input and which decreases a diameter of the output light; and a second optical fiber to which the output light output from the second lens is input and through which the output light propagates.

In such an optical amplifier, the seed light and the excitation light having the diameters increased by the first lens are input to the glass rod. Therefore, the number of rare earth elements, through which the seed light and the excitation light pass is large in the glass rod so that more stimulated emission is caused, whereby the seed light can be further amplified.

In addition, since the diameter of the seed light is increased by the first lens, an intensity of light per unit area at a section perpendicular to a traveling direction of the seed light in the glass rod is lower than an intensity of light in an amplifying optical fiber when the seed light is amplified by using a typical amplifying optical fiber. Therefore, even when an intensity of at least one of the seed light and the excitation light input from the first optical fiber is increased, a nonlinear optical effect can be suppressed in the glass rod.

The seed light amplified in the glass rod in such a manner is output as the output light, is made to have a diameter decreased by the second lens to be the output light having a high intensity, and propagates through the second optical fiber.

As described above, more stimulated emission can be caused in the glass rod and the nonlinear optical effect can be suppressed, whereby the output light having a high intensity can be obtained.

It is suitable that the first lens outputs the seed light as parallel light in the optical amplifier described above. With such a configuration, a coupling loss is not affected even when a length of the glass rod is changed to some extent. Therefore, a change in the coupling loss has little effect on the optical amplification even when the glass rod is extended or contracted in a length direction thereof due to heat or the like, and thus the optical amplification is stabilized. In addition, since the first lens and the second lens can be similarly configured, cost can be reduced.

It is suitable that the first lens is a GRIN lens and fused to at least one of the first optical fiber and the glass rod and that the second lens is a GRIN lens and fused to at least one of the second optical fiber and the glass rod in the optical amplifier described above.

By using a GRIN lens as the first lens and fusing the first lens to at least one of the first optical fiber and the glass rod as described above, a loss of light between the first lens and the first optical fiber or between the first lens and the glass rod is suppressed as compared to a case where a gap exists between the first optical fiber and the first lens and between the glass rod and the first lens. Similarly, by using a GRIN lens as the second lens and fusing the second lens to at least one of the second optical fiber and the glass rod, a loss of light between the second lens and the second optical fiber or between the second lens and the glass rod is suppressed as compared to a case where a gap exists between the second optical fiber and the second lens and between the glass rod and the second lens. Consequently, the output light having a higher intensity can be output.

It is suitable that the first lens also serves as the second lens, a reflector that reflects light in a wavelength band that is the same as at least the seed light among light input to the glass rod toward the first lens is provided on a side of the glass rod opposite to the first lens, and the seed light reflected by the reflector is input from the glass rod to the first lens as the output light, and input to the second optical fiber with a diameter decreased by the first lens in the optical amplifier described above.

With such a configuration, the seed light and the excitation light input from the first optical fiber and having diameters increased by the first lens are input to the glass rod and the seed light is amplified in the glass rod. Since the reflector that reflects light in the wavelength band that is the same as at least the seed light among light input from the first lens toward the first lens is provided on the side of the glass rod opposite to the first lens in this case, the seed light input to the glass rod is reflected toward the first lens. Then the seed light amplified and output from the glass rod toward the first lens is input to the second optical fiber through the first lens serving as the second lens as the output light. By using the first lens as both of the first lens and the second lens as described above, the optical amplifier can be downsized.

It is preferable that the reflector also reflects light in the wavelength band that is the same as the excitation light in the optical amplifier described above. With such a configuration, the excitation light is also reflected by the reflector, and thus an intensity of the excitation light becomes uniform in an optical axis direction of the glass rod. Consequently, the seed light can be effectively amplified.

Alternatively, it is also preferable that the reflector transmits light in the wavelength band that is the same as the excitation light in the optical amplifier described above. With such a configuration, the excitation light is prevented from being input to the second optical fiber and the output light of high beam quality can be output from the second optical fiber.

A resonator according to the invention outputs output light based on excitation light and includes: a first optical fiber through which the excitation light and light having the same wavelength as the output light propagate and which is provided with a first reflection element that reflects light having the same wavelength as the output light; a glass rod doped with rare earth elements that are excited by the excitation light to emit light including light having the same wavelength as the output light; a second optical fiber through which light having the same wavelength as at least the output light propagates and which is provided with a second reflection element that reflects the light having the same wavelength as the output light at a lower reflectance than the first reflection element; a first lens that outputs light input from the first optical fiber to the glass rod with an increased diameter and that outputs light input from the glass rod to the first optical fiber with a decreased diameter; and a second lens that outputs light input from the second optical fiber to the glass rod with an increased diameter and that outputs light input from the glass rod to the second optical fiber with a decreased diameter.

With such a resonator, light having the same wavelength as the output light reciprocates between the first reflection element and the second reflection element. At this time, lights input to the glass rod from the first optical fiber side and the second optical fiber side are made to have diameters increased by the first lens and the second lens, respectively. Therefore, the number of rare earth elements passed through by the excitation light and light having the same wavelength as the output light in the glass rod is large, and thus more stimulated emission can be caused to further amplify light.

Since diameters of light input to the glass rod are increased by the first lens and the second lens, an intensity of light per unit area at a section perpendicular to a light proceeding direction in the glass rod is lower than an intensity of light in an amplifying optical fiber when a typical amplifying optical fiber is used to resonate the light. Accordingly, even when light having a high intensity is input from the first optical fiber or the second optical fiber, the nonlinear optical effect can be suppressed in the glass rod.

Since more stimulated emission is caused in the glass rod and the nonlinear optical effect is suppressed as described above, the output light having a high intensity can be output.

It is suitable that the first lens outputs light having the same wavelength as the output light to the glass rod as parallel light in the resonator described above. With such a configuration, a coupling loss is not affected even when a length of the glass rod is changed to some extent. Therefore, a change in the coupling loss has little effect on an optical amplification even when the glass rod is extended or contracted in a length direction thereof due to heat or the like, and thus the optical amplification is stabilized. In addition, since the first lens and the second lens can be similarly configured, cost can be reduced.

It is suitable that the first lens is a GRIN lens and fused to at least one of the first optical fiber and the glass rod and that the second lens is a GRIN lens and fused to at least one of the second optical fiber and the glass rod in the resonator described above. With such a configuration, a loss of light between the first lens and the first optical fiber or between the first lens and the glass rod is suppressed and a loss of light between the second lens and the second optical fiber or between the second lens and the glass rod is suppressed. Consequently, the output light having a higher intensity can be output.

It is suitable that the first lens also serves as the second lens, a reflector that reflects light having the same wavelength as at least the output light among light input to the glass rod toward the first lens is provided on a side of the glass rod opposite to the first lens, and the light having the same wavelength as the output light and reflected by the reflector is input from the glass rod to the first lens and input to the second optical fiber with a diameter decreased by the first lens. By using the first lens as both of the first lens and the second lens as described above, the resonator can be downsized.

It is preferable that the reflector also reflects light in a wavelength band that is the same as the excitation light in the resonator described above. With such a configuration, the excitation light is also reflected by the reflector, and thus an intensity of the excitation light in an optical axis direction of the glass rod becomes uniform. Consequently, light can be effectively amplified.

Alternatively, it is also preferable that the reflector transmits light in a wavelength band that is the same as the excitation light in the optical amplifier described above. With such a configuration, the excitation light can be prevented from being input to the second optical fiber and the output light of high beam quality can be output from the second optical fiber.

As described above, an optical amplifier and a resonator capable of outputting output light having a high intensity can be provided according to the invention.

DETAILED DESCRIPTION OF THE PREFERRED EMBODIMENTS

Figure 1:
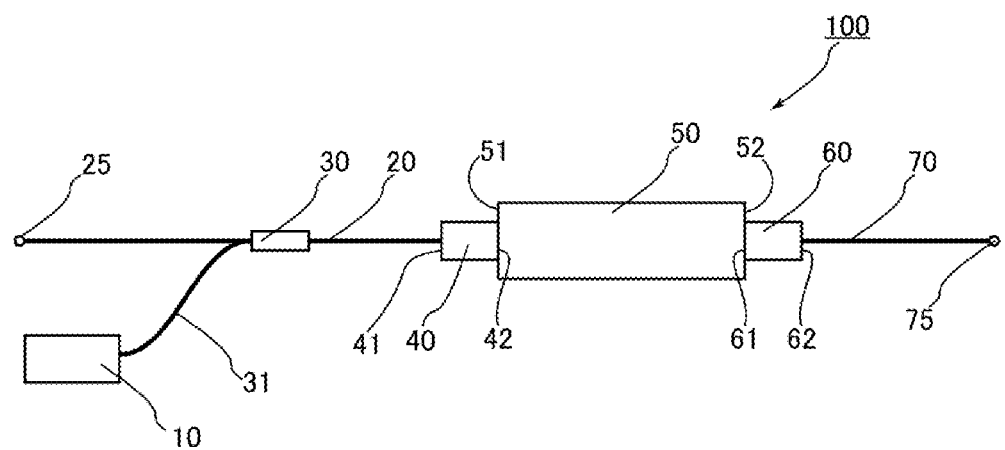
FIG. 1 is a view showing an optical amplifier according to a first embodiment of the invention.

Preferred embodiments of an optical amplifier and a resonator according to the invention will be explained hereinafter referring to the drawings.

First Embodiment

A first embodiment relates to an optical amplifier and FIG. 1 is a view showing an optical amplifier according to the first embodiment of the invention.

As shown in FIG. 1, an optical amplifier 100 includes: an excitation light source 10 that outputs excitation light; a first optical fiber 20, through which seed light and the excitation light propagate; an optical coupler 30 that inputs the excitation light into the first optical fiber; a first lens 40 to which the seed light and the excitation light output from the first optical fiber 20 are input; a glass rod 50 to which the seed light and the excitation light output from the first lens 40 are input and which amplifies and outputs the seed light as output light; a second lens 60 to which at least the output light output from the glass rod 50 is input; and a second optical fiber 70 to which the output light output from the second lens 60 is input.

The excitation light source 10 is configured by a laser diode, for example, and outputs the excitation light having a wavelength of 975 nm, for example.

Figure 2:
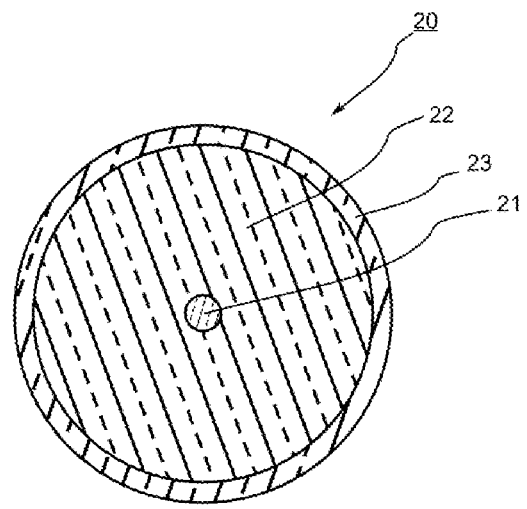
FIG. 2 is a sectional view of a first optical fiber shown in FIG. 1.

The optical fiber 20 has an input end 25, through which the seed light is input. FIG. 2 is a sectional view of the first optical fiber 20 shown in FIG. 1. As shown in FIG. 2, the optical fiber 20 is configured by a double clad fiber and specifically includes: a core portion 21 provided at the center of the optical fiber 20; a clad portion 22 coating the core portion 21; and a plastic clad portion 23 coating the clad portion 22. The core portion 21 is configured to have a larger refractive index than the clad portion 22 and the plastic clad portion 23 is configured to have a significantly smaller refractive index than the clad portion 22. A diameter of the core portion 21 is 10 μm, for example, but not particularly limited thereto. An outer diameter of the clad portion 22 is 125 μm, for example, but not particularly limited thereto. An outer diameter of the plastic clad portion 23 is 150 μm, for example, but not particularly limited thereto. The first optical fiber can allow the seed light having a wavelength of 1032 nm, for example, to propagate through the core portion 21 as single mode light and allow the excitation light to propagate through the clad portion 22 as multi mode light.

The optical coupler 30 is provided at the middle of the first optical fiber 20 and has an excitation light input port 31, through which the excitation light from the excitation light source 10 is input. The excitation light input port 31 is configured by a multi mode fiber that allows the excitation light output from the excitation light source 10 to propagate as multi mode light. The optical coupler 30 inputs the excitation light output from the excitation light source 10 to the first optical fiber 20.

The first lens 40 is configured by a GRIN (GRaded-Index: refractive index distribution) lens formed in a cylindrical shape larger than the outer diameter of the clad portion 22 of the first optical fiber 20. Specifically, the first lens 40 is configured to have a refractive index distribution in the diameter direction and not to have a refractive index distribution in the length direction, and configured to have the refractive index larger toward the center in the diameter direction and smaller at a portion closer to the side surface thereof, so that the refractive index gradually varies from the center to the side surface. Therefore, light input to the first lens 40 is refracted at the center portion of the first lens 40. Such a first lens is formed by doping a dopant such as fluorine and germanium to silica glass. Specifically, more germanium is doped toward the center in the diameter direction and more fluorine is doped toward the side surface. In this embodiment, the first lens 40 is configured to have a diameter of 0.4 mm and a length of 1.7 mm, for example, but the diameter and the length are not limited thereto.

To the center of one end surface 41 of the first lens 40, an end of the first optical fiber 20 opposite to the input end 25 is fused. An end surface 42 of the first lens 40 opposite to the end surface 41 is fused to an end surface 51 of the glass rod 50.

The glass rod 50 is formed in a cylindrical shape having a larger diameter than the first lens 40. The glass rod 50 is formed of silica glass doped with rare earth elements entirely uniformly. An end surface 52 of the glass rod 50 opposite to the end surface 51 is fused to an end surface 61 of the second lens 60.

The second lens 60 is configured similarly to the first lens 40 and an end surface 62 of the second lens 60 opposite to the end surface 61 is fused to the second optical fiber 70.

Figure 3:
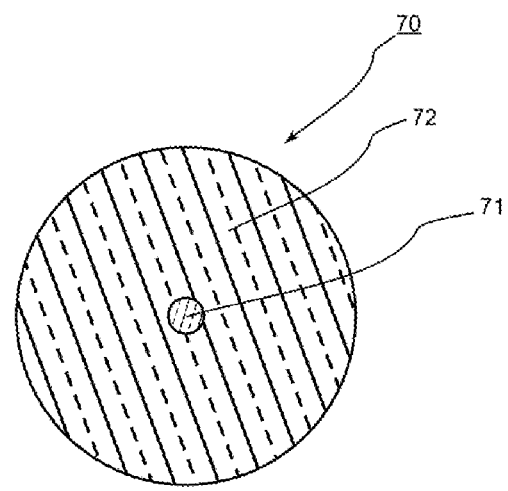
FIG. 3 is a sectional view of a second optical fiber shown in FIG. 1.

The second optical fiber 70 has an output end 75, through which the output light output from the glass rod is output. FIG. 3 is a sectional view of the second optical fiber 70 shown in FIG. 1. The second optical fiber 70 is configured by a single clad fiber including a core portion 71 and a clad portion 72. The core portion 71 is configured to have a larger refractive index than the clad portion 72. A diameter of the core portion 71 is 10 μm, for example, but not particularly limited thereto. An outer diameter of the clad portion 72 is 125 μm, for example, but not particularly limited thereto. When the first optical fiber allows the seed light having a wavelength of 1032 nm, for example, to propagate through the core portion 21 as described above, the second optical fiber 70 can allow light having the same wavelength as the seed light, for example, to propagate as single mode light through the core portion 71.

Next, optical paths and an optical amplification of the seed light and the excitation light in the optical amplifier 100 will be explained referring to FIGS. 1 and 4.

Figure 4:
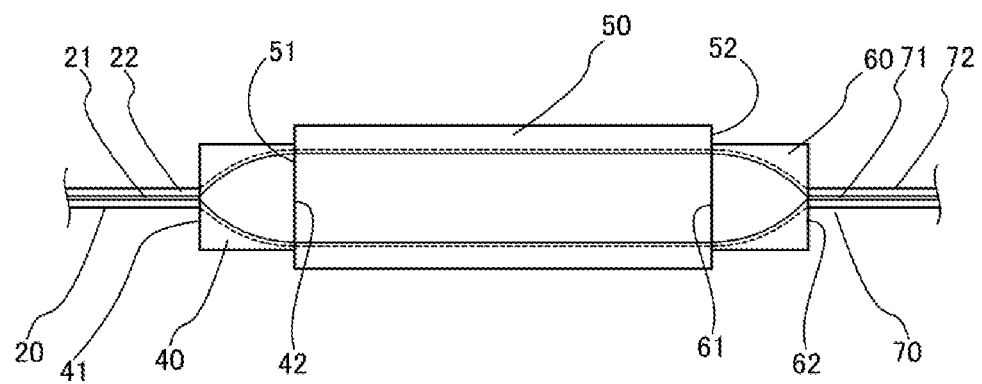
FIG. 4 is a view showing optical paths of seed light and excitation light in the optical amplifier shown in FIG. 1.

FIG. 4 is a view showing the optical paths of the seed light and the excitation light in the optical amplifier 100 shown in FIG. 1. The optical path of the seed light is shown in a solid line and the optical path of the excitation light is shown in a broken line. In FIG. 4, the plastic clad portion 23 of the first optical fiber 20 is not illustrated.

The seed light input to the core portion 21 of the first optical fiber 20 from the input end of the first optical fiber 20 propagates through the core portion 21 of the first optical fiber 20. The excitation light output from the excitation light source 10 is input to the first optical fiber through the optical coupler 30 and propagates through the core portion 21 and the clad portion 22 of the first optical fiber 20.

The seed light and the excitation light having propagated through the first optical fiber 20 are then output from the first optical fiber 20 and input to the first lens 40. The first lens 40 is configured by a GRIN lens as described above, and thus the seed light and the excitation light input to the first lens 40 are refracted inside the first lens 40. The seed light and the excitation light input to the first lens 40 are made to have diameters increased inside the first lens 40 and then output from the end surface 42 side. At this time, the seed light and the excitation light are output as parallel light from the first lens 40. At this time, the seed light has a diameter of 0.15 mm and the excitation light has a diameter of 0.3 mm, for example, at the end surface 42.

Here, the first lens 40 is configured to have a refractive index distribution and a length so as to output the seed light and the excitation light as parallel light.

The seed light and the excitation light output from the first lens 40 are input to the glass rod 50. At this time, in the glass rod 50, the excitation light excites the rare earth elements in the glass rod 50. Then the excited rare earth elements cause a stimulated emission by the seed light and the seed light is amplified by the stimulated emission.

The seed light amplified in the glass rod 50 is output from the glass rod 50 as the output light and input to the second lens 60. Then the output light is output with a diameter decreased by the second lens 60.

The output light output from the second lens 60 is input to the core portion 71 of the second optical fiber 70, propagates through the core portion 71 of the second optical fiber 70 as single mode light, and is output from the output end 75.

In the optical amplifier 100 of this embodiment, the seed light and the excitation light having the diameters increased by the first lens 40 are input to the glass rod 50 doped with the rare earth elements as described above. Accordingly, the number of the rare earth elements, through which the seed light and the excitation light pass, is large in the glass rod 50 so that more stimulated emission is caused to further amplify the seed light.

In addition, since the diameter of the seed light is increased by the first lens 40, an intensity of light per unit area at a section perpendicular to a traveling direction of the seed light in the glass rod 50 is lower than an intensity of light in an amplifying optical fiber when the seed light is amplified by using a typical amplifying optical fiber. Therefore, even when an intensity of at least one of the seed light and the excitation light input from the first optical fiber 20 is increased, a nonlinear optical effect can be suppressed in the glass rod 50.

The seed light amplified in the glass rod in such a manner is output as the output light, is made to have a diameter decreased by the second lens 60, and propagates through the second optical fiber 70.

Since more stimulated emission can be caused in the glass rod 50 in the optical amplifier 100 of this embodiment as described above, the nonlinear optical effect can be suppressed, and thus the output light having a high intensity can be obtained.

In the optical amplifier 100, the seed light output from the first lens 40 is made to be parallel light by the first lens 40. Accordingly, a coupling loss is not affected even when a length of the glass rod 50 is changed to some extent. Therefore, a change in the coupling loss has little effect on the optical amplification even when the glass rod 50 is extended or contracted in a length direction thereof due to heat or the like, and thus the optical amplification is stabilized.

Since the first lens 40 and second lens 60 are similarly configured, cost can be reduced as compared to a case where the first lens 40 and the second lens 60 are differently configured.

In the optical amplifier 100, the first lens 40 is configured by a cylindrical GRIN lens and the first lens 40 is fused to the first optical fiber 20 and to the glass rod 50. Further, the second lens 60 is configured by a cylindrical GRIN lens and the second lens 60 is fused to the second optical fiber 70 and to the glass rod 50. Therefore, a loss of the seed light, the output light, and the excitation light is suppressed as compared to a case where a gap exists between the first lens 40 and the first optical fiber 20 and between the first lens 40 and the glass rod 50 or a case where a gap exists between the second lens 60 and the second optical fiber 70 and between the second lens 60 and the glass rod 50. Consequently, the output light having a higher intensity can be output. In addition, a relative positional relationship of the first optical fiber 20, the first lens 40, the glass rod 50, and the second lens 60 is not changed and a long-term reliability can be enhanced.

Second Embodiment

Next, a second embodiment of the invention will be explained in detail referring to FIG. 5. This embodiment relates to an optical amplifier similarly to the first embodiment. Here, components that are identical or similar to those in the first embodiment are indicated by the same reference numerals and the same explanation will not be repeated.

Figure 5:
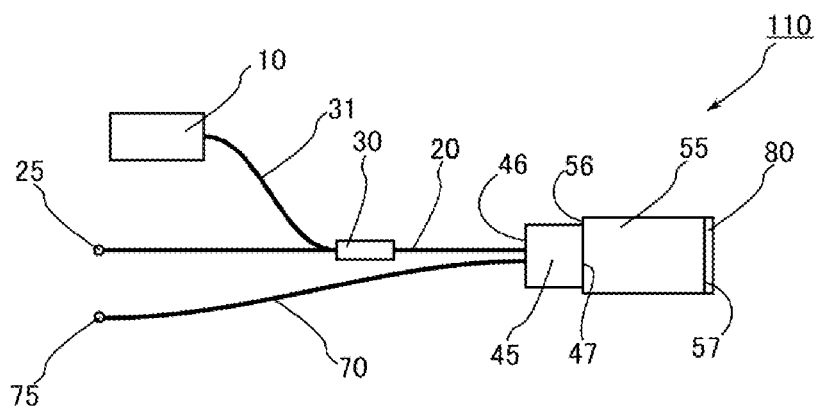
FIG. 5 is a view showing an optical amplifier according to a second embodiment of the invention.

FIG. 5 is a view showing an optical amplifier according to the second embodiment of the invention. As shown in FIG. 5, the first optical fiber 20 and the second optical fiber 70 are fused to an end surface 46 on a first optical fiber side of a first lens 45 formed in a cylindrical shape in an optical amplifier 110. At this time, the first optical fiber 20 and the second optical fiber 70 are fused to the end surface 46 at positions slightly shifted from the center thereof, and the first optical fiber 20 and the second optical fiber 70 are respectively fused at positions symmetrical about the center of the end surface 46.

An end surface 47 of the first lens 45 opposite to the first optical fiber 20 is fused to the end surface 56 of a glass rod 55. The first lens 45 is configured by a GRIN lens similarly to the first embodiment. In this embodiment, the first lens 45 is configured to have a diameter of 0.5 mm and a length of 1.4 mm, for example.

A glass rod 55 fused to the first lens 45 is formed in a cylindrical shape having a larger diameter than the first lens 45. The glass rod 55 is formed of silica glass doped with rare earth elements entirely uniformly.

On an end surface 57 of the glass rod 55 opposite to the end surface 56 to which the first lens 45 is fused, a mirror 80 is provided as a reflector that reflects the seed light and the excitation light input to the glass rod 55. The mirror 80 is formed by depositing nickel-magnesium alloy or metal such as aluminum on the end surface 57 of the glass rod 55, for example.

Next, optical paths and an optical amplification of the seed light and the excitation light in the optical amplifier 110 will be explained referring to FIGS. 5 and 6.

Figure 6:
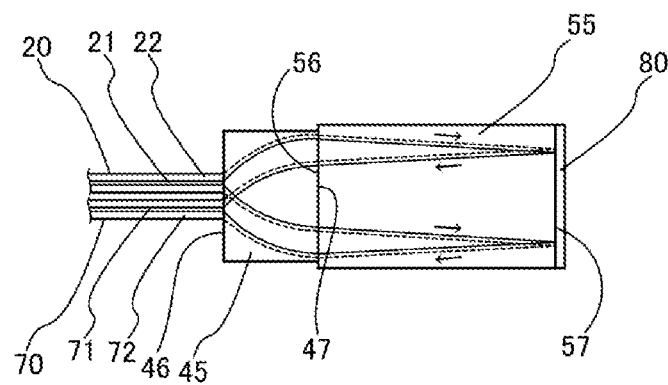
FIG. 6 is a view showing optical paths of seed light and excitation light in the optical amplifier shown in FIG. 5.

FIG. 6 is a view showing the optical paths of the seed light and the excitation light in the optical amplifier 110 shown in FIG. 5. The optical path of the seed light is shown in a solid line and the optical path of the excitation light is shown in a broken line. In FIG. 6, the plastic clad portion 23 of the first optical fiber 20 is not illustrated.

The seed light and the excitation light having propagated through the first optical fiber 20 are output from the first optical fiber 20 and input to the first lens 45. As described above, the first lens 45 is configured by a GRIN lens, and thus the seed light and the excitation light input to the first lens 45 are refracted inside the first lens 45. The seed light and the excitation light input to the first lens 45 are made to have diameters increased inside the first lens 45 and then output from the end surface 47 side of the first lens 45. At this time, the seed light and the excitation light are output as parallel light from the first lens 45. The seed light has a diameter of 0.5 mm and the excitation light has a diameter of 1.4 mm, for example, at the end surface 42 of the first lens 45.

The seed light and the excitation light output from the first lens 45 are input to the glass rod 55. At this time, in the glass rod 55, the excitation light excites the rare earth elements in the glass rod 55. Then the excited rare earth elements cause a stimulated emission by the seed light and the seed light is amplified by the stimulated emission.

The seed light amplified in the glass rod 55 is reflected toward the first lens 45 by the mirror 80. Then the amplified seed light proceeds from the mirror 80 toward the first lens 45 while further amplified on its way.

The amplified seed light is output from the end surface 56 side of the glass rod 55 as the output light and input back to the first lens 45. The output light input to the first lens 45 is output with a diameter decreased by the first lens 45. Then the output light having the decreased diameter is input to the core portion 71 of the second optical fiber 70, propagates through the core portion 71 of the second optical fiber 70 as single mode light, and is output from the output end 75.

In the optical amplifier 110 of this embodiment, the first lens 45 is used as both the first lens 40 and the second lens 60 in the first embodiment. Therefore, it is not necessary to provide lenses on both ends of the glass rod, and thus the optical amplifier can be downsized. Further, since the excitation light is also reflected by the mirror 80, an intensity of the excitation light in an optical axis direction of the glass rod 55 becomes uniform in a length direction of the glass rod 55. Consequently, the seed light can be effectively amplified.

Third Embodiment

Next, a third embodiment of the invention will be explained in detail referring to FIG. 7. This embodiment relates to an optical amplifier similarly to the second embodiment. Here, components that are identical or similar to those in the second embodiment are indicated by the same reference numerals and the same explanation will not be repeated.

Figure 7:
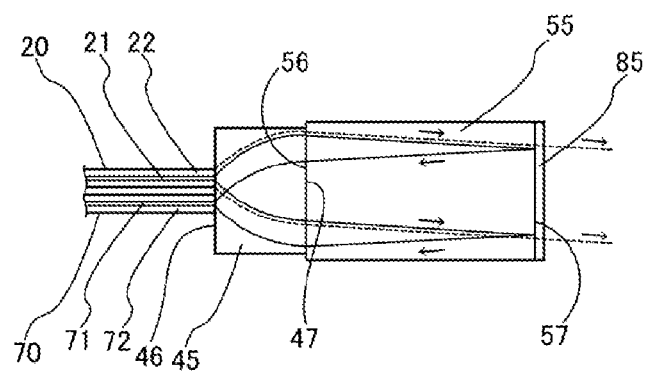
FIG. 7 is a view showing optical paths of seed light and excitation light in a glass rod of an optical amplifier according to a third embodiment of the invention.

FIG. 7 is a view showing optical paths of the seed light and the excitation light in a glass rod of the optical amplifier according to the third embodiment of the invention. In FIG. 7, the optical path of the seed light is shown in a solid line, the optical path of the excitation light is shown in a broken line, and the plastic clad portion 23 of the first optical fiber 20 is not illustrated similarly to FIG. 6.

The optical amplifier of this embodiment is different from the optical amplifier of the second embodiment in that the optical amplifier of this embodiment is provided with an optical filter 85, as shown in FIG. 7, which reflects light having the same wavelength as the seed light and transmits light having the same wavelength as the excitation light instead of the mirror 80 shown in FIGS. 5 and 6. The optical filter 85 may be configured by a multilayer film including oxide films of silicon, tantalum, titanium, niobium and the like. When the seed light has the wavelength of 1032 nm and the excitation light has the wavelength of 975 nm as described above, for example, the optical filter may be a dielectric multilayer film optical filter that contains silicon dioxide ($SiO_2$) as low refractive index material and tantalum pentoxide ($Ta_2O_5$) as high refractive index, has 41 layers, and has a total film thickness of 5.1 m.

In such an optical amplifier, the seed light input to the glass rod 55 is amplified by the excitation light and reflected by the optical filter 85 so as to be input to the second optical fiber 70 through the first lens 45 as shown in FIG. 7. On the other hand, the excitation light is transmitted through the optical filter 85 and output to the outside of the optical amplifier.

With the optical amplifier of this embodiment, the excitation light can be prevented from being input to the second optical fiber 70 and the output light of high beam quality can be output.

In this embodiment, the optical filter 85 is configured to transmit the excitation light; however, the optical filter 85 may be configured to reflect part of the excitation light and transmit other part of the excitation light. The optical filter 85 may be configured to reflect 50% of the excitation light and transmit the remaining 50% of the excitation light, for example. In this case, the seed light can be further amplified as compared to the case where the optical filter 85 transmits the excitation light, and the output light output from the optical amplifier can be of higher beam quality than that output from the optical amplifier of the second embodiment.

Fourth Embodiment

Next, a fourth embodiment of the invention will be explained in detail referring to FIG. 8. The fourth embodiment relates to a resonator. Here, components that are identical or similar to those in the first embodiment are indicated by the same reference numerals and the same explanation will not be repeated.

Figure 8:
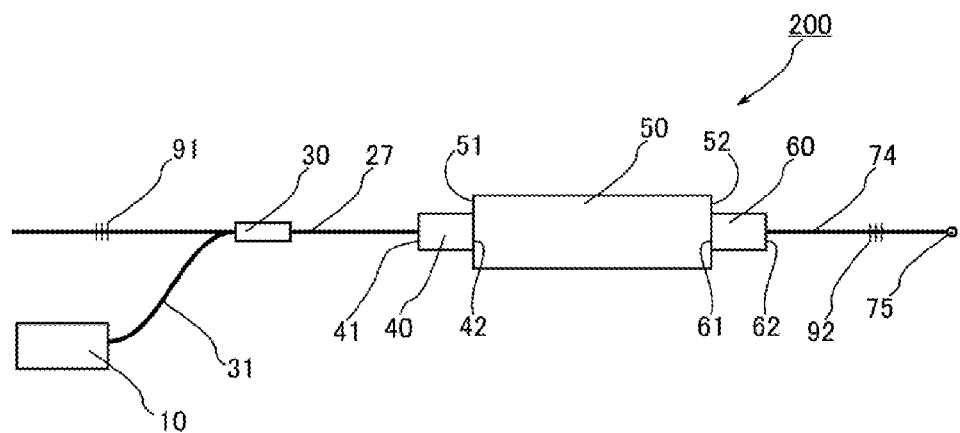
FIG. 8 is a view showing a resonator according to a fourth embodiment of the invention.

FIG. 8 is a view showing a resonator according to the fourth embodiment of the invention. As shown in FIG. 8, a resonator 200 is different from the optical amplifier 100 of the first embodiment in that the resonator 200 includes a first optical fiber 27 and a second optical fiber 74 instead of the first optical fiber 20 and the second optical fiber 70 of the optical amplifier 100 of the first embodiment.

A configuration of a section of the first optical fiber 27 is similar to that of the first optical fiber 20 of the first embodiment. The first optical fiber 27 is different from the first optical fiber 20 of the first embodiment in that the first optical fiber 27 does not have an input end and is provided with a first reflection element 91. The first reflection element 91 is configured by an FBG (Fiber Bragg Grating) and reflects light having a wavelength of 1032 nm at a reflectance of 99.5%.

A configuration of a section of the second optical fiber 74 is similar to that of the second optical fiber 70 of the first embodiment. The second optical fiber 74 is different from the second optical fiber 70 of the first embodiment that the second optical fiber 74 is provided with a second reflection element 92. The second reflection element 92 is configured by an FBG and reflects light having the same wavelength as light reflected by the first reflection element 91 at a lower reflectance than the first reflection element 91. Therefore, when the first reflection element 91 reflects light having the wavelength of 1032 nm as described above, the second reflection element 92 reflects light having this wavelength at a reflectance of 50% or less, for example.

Next, a resonance of light in the resonator 200 will be explained.

First, the excitation light is output from the excitation light source 10. The excitation light in this case is light having a wavelength of 975 nm, for example. The excitation light output from the excitation light source 10 is input to the first optical fiber 27 through the optical coupler 30 and propagates through the core portion 21 and the clad portion 22 of the first optical fiber 27. The excitation light propagating through the first optical fiber 27 is output from the first optical fiber 27 and input to the first lens 40.

The excitation light input to the first lens 40 is made to have an increased diameter and then output from the first lens 40 as parallel light. The excitation light output from the first lens 40 is input to the glass rod 50 and excites the rare earth elements doped in the glass rod 50, and the excited rare earth elements emit spontaneous emission light. The spontaneous emission light emitted at this time includes light having a wavelength allowing the light to be reflected by the first reflection element 91 and light having a wavelength allowing the light to be reflected by the second reflection element 92.

Light output from the glass rod 50 is input to the second lens 60, made to have a decreased diameter in the second lens 60, and output therefrom. The light output from the second lens 60 is input to the second optical fiber 74 and propagates through the second optical fiber. At least part of the light propagating through the second optical fiber 74 is reflected by the second reflection element 92.

The reflected light is input back to the second lens 60 from the second optical fiber 74, made to have an increased diameter, and then input to the glass rod 50 as parallel light. At this time, the rare earth elements in the glass rod 50 cause a stimulated emission by the light input to the glass rod 50, the light input to the glass rod 50 is amplified, and the amplified light is output from the glass rod 50.

The light amplified by the glass rod 50 and output therefrom is made to have a decreased diameter by the first lens 40 and input to the first optical fiber 27. The light input to the first optical fiber 27 propagates through the core portion 21 of the first optical fiber 27 as single mode light, is reflected by the first reflection element 91, is input back to the glass rod 50 through the first lens 40, and further amplified in the glass rod 50.

In this manner, light reciprocates between the first reflection element 91 and the second reflection element 92 and a resonance of light occurs while an optical amplification is provided in the glass rod 50. Then part of the resonating light is transmitted through the second reflection element 92 and output from the output end 75 as the output light.

With such a resonator, the light having the same wavelength as the output light reciprocates between the first reflection element 91 and the second reflection element 92. At this time, the light input to the glass rod 50 from the first optical fiber 27 side and the second optical fiber 74 side have diameters increased by the first lens 40 and the second lens 60, respectively. Therefore, the number of rare earth elements passed through by the excitation light and the light having the same wavelength as the output light in the glass rod 50 is large, and thus more stimulated emission can be caused to further amplify the light.

In addition, since diameters of light input to the glass rod 50 are increased by the first lens 40 and the second lens 60, an intensity of light per unit area at a section perpendicular to a traveling direction of light in the glass rod 50 is lowered. Accordingly, even when light having a high intensity is input to the glass rod 50 from the first optical fiber 27 or the second optical fiber 74, the nonlinear optical effect can be suppressed in the glass rod 50.

As described above, more stimulated emission light can be obtained in the glass rod and the nonlinear optical effect can be suppressed, and thus the output light having a high intensity can be obtained.

Fifth Embodiment

Next, a fifth embodiment of the invention will be explained in detail referring to FIG. 9. The fifth embodiment relates to a resonator. Here, components that are identical or similar to those in the second and fourth embodiments are indicated by the same reference numerals and the same explanation will not be repeated.

Figure 9:
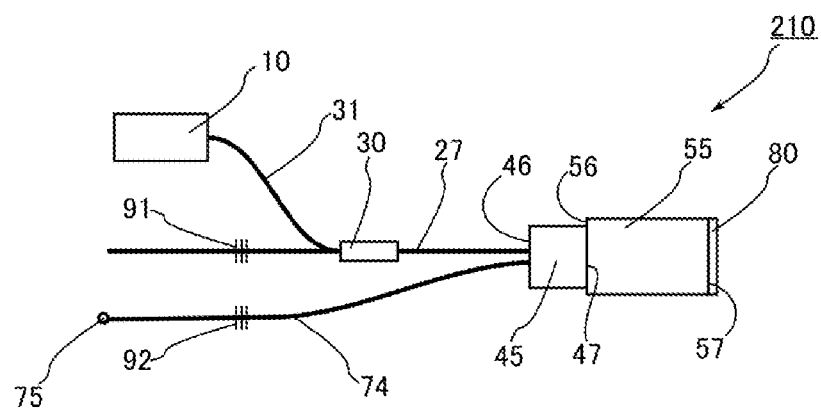
FIG. 9 is a view showing a resonator according to a fifth embodiment of the invention.

FIG. 9 is a view showing a resonator according to the fifth embodiment of the invention. As shown in FIG. 9, a resonator 210 is different from the optical amplifier 110 of the second embodiment in that the resonator 210 includes the first optical fiber 27 and the second optical fiber 74 instead of the first optical fiber 20 and the second optical fiber 70 of the second embodiment. The first optical fiber 27 and the second optical fiber 74 are configured similarly to the first optical fiber 27 and the second optical fiber 74 of the fourth embodiment.

The first optical fiber 27 and the second optical fiber 74 are fused to the end surface 46 on the first optical fiber 27 side of the first lens 45 formed in a cylindrical shape. At this time, the first optical fiber 27 and the second optical fiber 74 are fused to the end surface 46 at positions slightly shifted from the center thereof, and the first optical fiber 20 and the second optical fiber 70 are respectively fused at positions symmetrical about the center of the end surface 46.

In the resonator 210 as described above, the excitation light is first output from the excitation light source 10 similarly to the fourth embodiment, and propagates through the first optical fiber 27. The excitation light is output from the first optical fiber 27 and input to the first lens 45.

The excitation light input to the first lens 45 has an increased diameter and output from the first lens 45 as parallel light. The excitation light output from the first lens 45 is input to the glass rod 55 to excite the rare earth elements doped in the glass rod 55 and the excited rare earth elements emit spontaneous emission light. The spontaneous emission light emitted at this time has a wavelength similar to the fourth embodiment.

The light proceeding in the glass rod 55 is reflected by the mirror 80 so as to proceed back in the glass rod 55 toward the first lens 45. The light is output from the glass rod 55 and input to the first lens 45. The light input to the first lens 45 is output with a decreased diameter, is input to the second optical fiber 74, and propagates through the second optical fiber. Then at least part of the light having propagated through the second optical fiber 74 is reflected by the second reflection element 92 provided on the second optical fiber 74.

The reflected light is input back to the first lens 45 from the second optical fiber 74, has an increased diameter, and is input to the glass rod 55 as parallel light. At this time, the rare earth elements in the glass rod 55 cause a stimulated emission by the light input to the glass rod 50, and the light input to the glass rod is amplified. Then, the amplified light is reflected by the mirror 80 and proceeds toward the first lens 45 while amplified on its way.

The light amplified in the glass rod 55 and output therefrom has a decreased diameter by the first lens 45 and input to the first optical fiber 27. The light input to the first optical fiber 27 propagates through the first core portion 21 of the first optical fiber 27, is reflected by the first reflection element 91, is input back to the glass rod 55 through the first lens 45, and is amplified in the glass rod 55 again.

In this manner, light reciprocates between the first reflection element 91 and the second reflection element 92 and a resonance of light occurs while an optical amplification is provided in the glass rod 55. Then, part of the resonating light is transmitted through the second reflection element 92 and output from the output end 75 as the output light.

In the resonator 210 of this embodiment, the first lens 45 is used as both the first lens 40 and the second lens 60 in the third embodiment. Therefore, it is not necessary to provide lenses on both ends of the glass rod, and thus the resonator can be downsized. Further, since the excitation light is also reflected by the mirror 80, an intensity of the excitation light in the optical axis direction of the glass rod 55 becomes uniform. Consequently, the light can be effectively amplified.

In this embodiment, the optical filter 85 may be provided as a reflector instead of the mirror 80 similarly to the third embodiment. With such a configuration, the excitation light can be prevented from being input to the second optical fiber 74 and the output light of high beam quality can be output also in this embodiment. Further, also in this case, the optical filter 85 may be configured to reflect part of the excitation light and transmit other part of the excitation light. With such a configuration, the seed light can be further amplified as compared to the case where the optical filter 85 transmits the excitation light, and the output light output from the resonator can be of higher beam quality than that output from the resonator of the embodiment described above.

Although the invention has been described above with reference to certain embodiments as examples, the invention is not limited thereto.

For example, in the first and fourth embodiments, the glass rod 50 is formed of silica glass doped with rare earth elements entirely uniformly; however, the glass rod may be doped with rare earth elements with a higher concentration toward the center axis of the glass rod. Light having a diameter increased by a lens tends to have a higher intensity toward an optical axis. Therefore, the seed light in the glass rod 50 also tends to have a higher intensity toward the optical axis. Therefore, the seed light can be more effectively amplified by configuring the glass rod to have rare earth elements with a higher concentration toward the center axis where the seed light has a higher intensity.

In the first to fifth embodiments, light such as the seed light and the excitation light output from the first lens 40 or 45 are made to be parallel light. However, the invention is not limited thereto. For example, after the seed light is output from the first lens 40, a diameter of the seed light may be gradually increased or decreased in contrast, in the glass rod 50.

Figure 10:
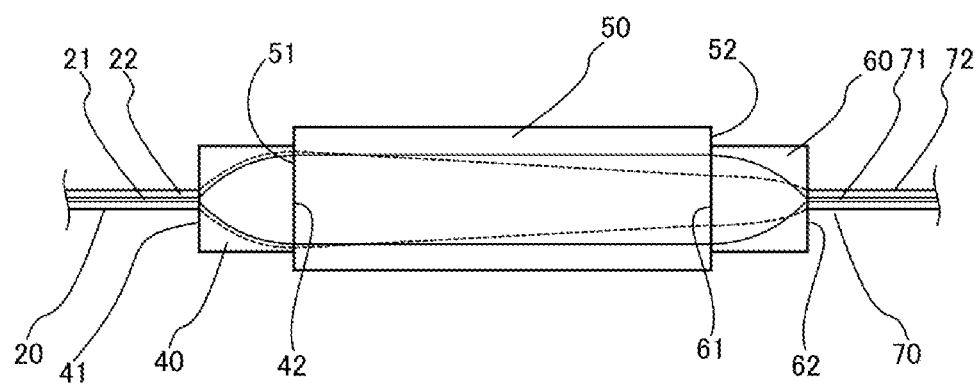
FIG. 10 is a view showing the optical paths of the seed light and the excitation light in the optical amplifier shown in FIG. 1.

In the first and fourth embodiments, after the excitation light is output from the first lens 40, the diameter of the excitation light may be gradually decreased in the glass rod 50 as shown in FIG. 10. As described above, light having an increased diameter tends to have a higher intensity toward an optical axis. Therefore, an effective optical amplification can be performed by collecting the excitation light at a portion where light having a high intensity passes.

In order to output light from the first lens 40 as parallel light and to gradually decrease a diameter of the excitation light output from the first lens 40 from the first lens to the second lens in the glass rod as described above, a diameter of light output from the first lens 40 may be 0.15 mm, a diameter of the excitation light may be 0.3 mm, and further, a Numerical Aperture (NA) of the first lens 40 may be larger than that of the optical fiber through which the excitation light propagates, for example. With such a configuration, the first lens 40 can output light as parallel light and can output the excitation light having a shorter wavelength than the light to have a diameter gradually decreased from the first lens to the second lens.

In the first to fifth embodiments, the output light propagates through the second optical fibers 70 and 74 as single mode light; however, the second optical fibers 70 and 74 may be configured to propagate light of a plurality of modes including modes of seven or less, for example.

In the first and fourth embodiments, the ends of the first optical fibers 20 and 27 opposite to the input end 25 are fused to the center of the end surface 41 of the first lens 40; however, the fused position may be shifted from the center in the range of ±40% of the outer diameter of the first lens 40.

INDUSTRIAL APPLICABILITY

According to the invention, an optical amplifier and a resonator capable of outputting the output light having a high intensity can be provided.

What is claimed is:

1. A resonator that outputs output light based on excitation light, the resonator comprising:
   a first optical fiber through which the excitation light and light having the same wavelength as the output light propagate and which is provided with a first reflection element that reflects light having the same wavelength as the output light;
   a glass rod doped with rare earth elements that are excited by the excitation light to emit light including light having the same wavelength as the output light;
   a second optical fiber through which light having the same wavelength as at least the output light propagates and which is provided with a second reflection element that reflects the light having the same wavelength as the output light at a lower reflectance than the first reflection element;
   a first lens that outputs light input from the first optical fiber to the glass rod with an increased diameter and that outputs light input from the glass rod to the first optical fiber with a decreased diameter; and
   a second lens that outputs light input from the second optical fiber to the glass rod with an increased diameter and that outputs light input from the glass rod to the second optical fiber with a decreased diameter,
   wherein, inside the glass rod, the excitation light has a larger diameter than the light having the same wavelength as the output light over the entire length of the glass rod.

2. The resonator according to claim 1, wherein the first lens outputs light having the same wavelength as the output light to the glass rod as parallel light.

3. The resonator according to claim 1, wherein the first lens is a GRIN lens and is fused to at least one of the first optical fiber and the glass rod.

4. The resonator according to claim 1, wherein the second lens is a GRIN lens and is fused to at least one of the second optical fiber and the glass rod.

5. The resonator according to claim 2, wherein the second lens is a GRIN lens and is fused to at least one of the second optical fiber and the glass rod.

6. The resonator according to claim 3, wherein the second lens is a GRIN lens and is fused to at least one of the second optical fiber and the glass rod.

7. The resonator according to claim 1, wherein the first lens also serves as the second lens,
   a reflector that reflects light having the same wavelength as at least the output light among light input to the glass rod toward the first lens is provided on a side of the glass rod opposite to the first lens, and the light having the same wavelength as the output light and reflected by the reflector is input from the glass rod to the first lens and input to the second optical fiber with a diameter decreased by the first lens.

8. The resonator according to claim 7, wherein the reflector also reflects light in a wavelength band that is the same as the excitation light.

9. The resonator according to claim 7, wherein the reflector transmits light in a wavelength band that is the same as the excitation light.

10. A resonator that outputs output light based on excitation light, the resonator comprising:

a first optical fiber through which the excitation light and light having the same wavelength as the output light propagate and which is provided with a first reflection element that reflects light having the same wavelength as the output light;

a glass rod doped with rare earth elements that are excited by the excitation light to emit light including light having the same wavelength as the output light;

a second optical fiber through which light having the same wavelength as at least the output light propagates and which is provided with a second reflection element that reflects the light having the same wavelength as the output light at a lower reflectance than the first reflection element;

a first lens that outputs light input from the first optical fiber to the glass rod with an increased diameter and that outputs light input from the glass rod to the first optical fiber with a decreased diameter; and a second lens that outputs light input from the second optical fiber to the glass rod with an increased diameter and that outputs light input from the glass rod to the second optical fiber with a decreased diameter, wherein the first lens also serves as the second lens, a reflector that reflects light having the same wavelength as at least the output light among light input to the glass rod toward the first lens is provided on a side of the glass rod opposite to the first lens, and the light having the same wavelength as the output light and reflected by the reflector is input from the glass rod to the first lens and input to the second optical fiber with a diameter decreased by the first lens.

11. The resonator according to claim 10, wherein the reflector also reflects light in a wavelength band that is the same as the excitation light.

12. The resonator according to claim 10, wherein the reflector transmits light in a wavelength band that is the same as the excitation light.

* * * * *